Patented June 29, 1937

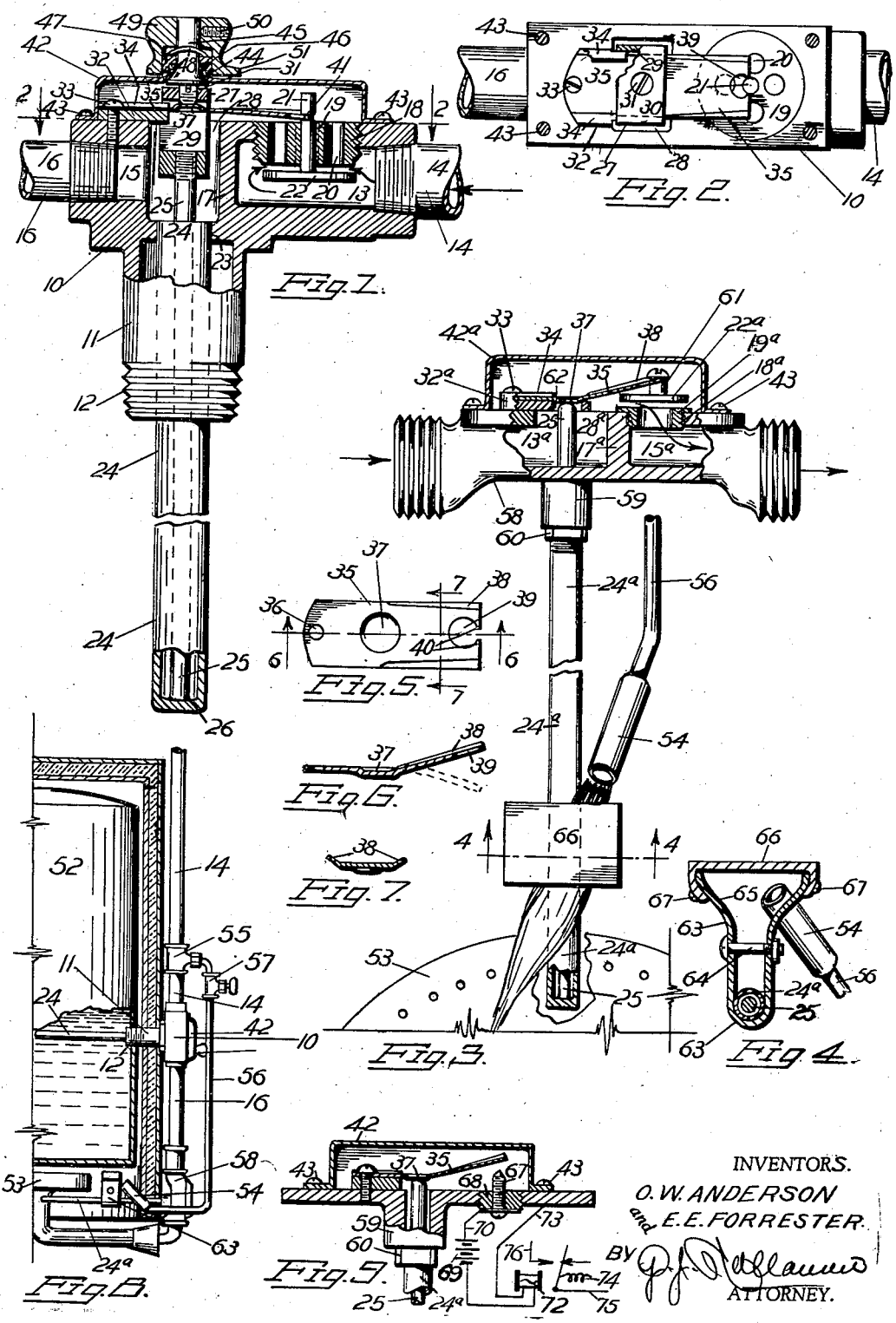

2,084,982

UNITED STATES PATENT OFFICE 2,084,982

THERMOSTATIC VALVE MECHANISM

Oscar W. Anderson and Edward E. Forrester, Denver, Colo.

Application May 28, 1935, Serial No. 23,842

3 Claims. (Cl. 236—48)

This invention relates to improvements in thermo-responsive mechanisms for controlling valves and electric switches by a snap action.

In the automatic control of gas heating appliances and electric heating appliances, it is customary to provide thermostats, which respond to the temperature produced by the gas or electric heaters, to turn on and off the gas or the electric current.

It is the principal object of this invention to produce a thermo-responsive valve, for use with gas water heaters, and gas furnaces, for turning the gas on and off at predetermined temperatures and which will also close a valve in the gas line whenever the pilot burner, with which such apparatus is invariably supplied, goes out.

Another object of this invention is to produce a temperature responsive device of exceedingly simple construction which can be manufactured at a very reasonable cost and which can be easily assembled.

A further object of this invention is to produce a device that shall operate with a "snap" action so that the valve or switch controlled thereby will open and close suddenly and thus obviate the objections that are inherent in devices, for this purpose, which operate with a slow movement.

A still further object is to produce a resilient snap element that can be employed in devices like those that will be described herein but which can also be used in any apparatus where a variable pressure is to be employed to open or close a valve or an electric circuit for any purpose.

The above and other objects that may become apparent as this description proceeds are attained by means of a construction and an arrangement of parts that will now be described in detail and for this purpose reference will be had to the accompanying drawing in which the invention has been illustrated in its present preferred form and in which Figure 1 is a view, partly in section and partly in elevation, showing the invention applied to a valve mechanism;

Figure 2 is a top plan view of the control valve;

Figure 3 is a view, partly in section and partly in elevation, showing the invention applied to a control valve which depends for its operation on the functioning of a pilot burner;

Figure 4 is a section taken on line 4—4, Figure 3, and shows a means for conducting heat from the pilot flame to the thermal element of the valve;

Figure 5 is a top plan view of the resilient snap element;

Figure 6 is a longitudinal section taken on line 6—6, Figure 5;

Figure 7 is a transverse section taken on line 7—7, Figure 5;

Figure 8 is a section taken through a hot water tank and shows the invention applied to the control of the gas therefor; and Figure 9 is a view showing how the invention can be applied to the control of an electric circuit.

In the drawing reference numeral 10 designates the body of the valve, which is preferably a brass casting, having a tubular member 11 extending from one side thereof and provided with a threaded section 12.

The body of the valve has been illustrated as of elongated rectangular shape and has an opening 13 extending thereinto from one end, for the reception of the gas supply pipe 14. The other end of the body has an opening 15 for the reception of the gas outlet pipe 16. A partition 17 separates the two openings. The wall of opening 13 has a threaded opening 18 in which is located a threaded plug 19 through which several openings 20 extend.

Plug 19 has a central opening through which the stem 21 of a flat valve 22 projects. The valve body has an opening 23 that connects the opening 15 with the interior of the plug 11.

A copper tube 24 has one end secured to the wall of opening 23 by a gas-tight joint. A bar 25 of invar, or other alloy having a low coefficient of expansion as compared to that of the tube 24, extends through the latter and the ends of the tube and the bar are connected by grazing or soldering, as indicated by reference numeral 26 in Figure 1. Secured to the outer end of bar 25, as by threads, is a yoke 27 of substantially rectangular shape. The outer wall of opening 15 has a rectangular opening 28 through which the yoke extends. The rectangular opening in the yoke has been designated by numeral 29.

The outer wall of the yoke, which has been designated by numeral 30, has a threaded opening in which is located a screw 31 whose outer end is slotted.

A block 32 is secured to the outside of the valve body by means of a screw 33. This block has one end projecting into the opening in the yoke and is provided on its upper surface wtih a flange or rib 34 along each edge; the inner edges of flanges 34 are grooved for the reception of the edges of the resilient strip 35, whose construction has been illustrated in Figures 5, 6 and 7 and which is provided at one end with an opening 36 for the reception of the screw 33. This strip is an important part of the invention and the successful operation of the mechanism depends on its construction and characteristic mode of operation. Strip 35 is made from steel, but can be made from spring brass, bronze or other resilient metal having "spring" properties, and is quite thin. A number of these strips are assembled to form a laminated element having the requisite strength, but owing to the difficulty of indicating such thin laminations on the drawing, it has been illustrated as made from one piece.

The strip employed in the device from which the drawing was made is two inches long and five-eighths of an inch wide, but it can be made of any suitable size. At a point substantially midway between the ends, the strip is provided with a circular depression 37 which is formed by suitable dies, and the bottom of which will be referred to as the diaphragm. The upper and lower surfaces of the diaphragm will be designated respectively as concave and convex in the specification and the claims, although it may be almost flat as shown in the drawing, or spherical.

The edges of the strip, from the center of the diaphragm have been bent so as to form upwardly ranging flanges 38 that serve to give rigidity to the strip and to resist transverse flexure. The free end of the strip opposite from hole 36 has an opening 39 formed with oppositely projecting points 40 for a purpose that will presently appear.

A strip like that illustrated in Figures 5, 6 and 7 and just described, has the peculiar property of bending with a snap action and about an axis passing through the center of the diaphragm and transverse to the longitudinal axis of the strip when sufficient pressure is applied to the convex surface of the diaphragm, and to resume its original shape by the same snap action when this pressure is removed. The property of the flexible strip that has just been described is taken advantage of in the device under consideration.

The end of a strip made as above described is inserted into grooves in the flanges 34 of block 32 in such a position that the convex surface of the diaphragm is on the upper side, and the strip is then inserted through the yoke 27 and the block and strip are then attached to the body by means of the screw 33; the parts are so proportioned and positioned that this brings the diaphragm directly beneath the end of screw 31. The valve stem 21 is provided with an annular groove 41 in which the points 40 of the strip engage.

The parts are so designed that when no pressure is exerted on the diaphragm the valve 22 will be in the position shown in Figure 1, which is the open position. Screw 31 is now adjusted until it comes very close to the convex surface of the diaphragm or into contact therewith. If the copper tube 24 is now heated it expands and, since the bar 25 has a very small and practically negligible coefficient of expansion, the yoke will be moved downwardly (Figure 1) and the end of screw 31 will begin to press against the convex surface of diaphragm 37, and after this surface has been deformed a predetermined amount, the strip will suddenly flex, throwing the free end upwardly and moving the valve member 22 into contact with the inner end of the plug 19, thereby closing the valve.

When the tube 24 is allowed to cool it contracts and moves the screw 31 away from the surface 37 and when the pressure has been decreased sufficiently the strip "snaps" back to its original position and opens the valve.

Attention is called at this point to the fact that the strip bends in the opposite direction from that in which the pressure is applied, thus, in Figure 1, when the screw 31 forces the diaphragm 37 downwardly it produces an upward throw of the end of the strip.

Another point to which attention is called is that there are no abutments necessary to resist the action of the screw 31. The strip is, of course, supported in the block 32 so that the screw 31 can exert the required pressure thereon but the strip projects from the block cantilever fashion and its end is not supported in any way.

The parts are adjusted so as to close the valve at a predetermined temperature and this adjustment can be made by immersing the tube 24 in a liquid maintained at the desired temperature and then adjusting screw 31 until the valve closes at this temperature.

A cap 42 is secured to the valve body by screws 43 and encloses the strip and movable parts.

Since the chamber formed by the cap is constantly full of gas the joints between it and the body must be gas-tight. The cap has an opening surrounded by an outwardly inclined wall 44 and extending through this opening is a plug 45 whose surface is curved to fit the inner surface of the wall 44 and whose inner end has a blade that engages the slot in screw 31.

Packing 46 surrounds the plug and rests against the outer edge of wall 44 and is held in place by a cupped washer 47 which in turn is acted on by a spring washer 48. This packing box is enclosed in a recess in the knob 49 which is attached to the outer end of the plug 45 and secured to the latter by a set screw 50. The plug 45 functions as a screw driver and serves to turn the screw 31 for adjusting the temperature setting of the valve. Knob 49 is provided with a pointer 51 that cooperates with a scale on the outer surface of the cap 42 but which has not been shown.

When the thermostatic control valve, described above, is employed for controlling the gas to the burner of an automatic gas heater the plug 11 is screwed into an opening in the wall of tank 52 in the manner shown in Figure 8 and the gas enters through pipe 14 and is conducted to the burner 53 through pipe 16.

When the water in the tank falls below a predetermined temperature the valve opens to allow gas to flow to the burner and when the temperature reaches the value desired, the valve closes.

It is necessary for automatic heaters of this kind to have a pilot flame burning all of the time for the purpose of igniting the gas when it is turned on and the pilot burner has been designated by numeral 54 in Figures 3, 4 and 8. The gas for the pilot burner does not flow through the valve which controls the main burner, but is taken from the pipe 14 that is provided with a T 55 for this purpose. A small pipe or tube 56 conducts the gas from the T to the burner 54 and is provided with a cock 57 by means of which the flow of gas to the pilot burner can be controlled.

If the pilot burner flame should become extinguished for any reason there would be no means of igniting the gas at the main burner and the gas would therefore continue to flow until it would be discovered and the gas turned off. Since such heaters are invariably connected to the chimney or to the outside, the escaping gas might not be detected for a long time.

It is obvious that a second valve must be connected in the gas supply to the main burner and provided with means which holds it open as long as the pilot flame is burning but closes in a short time after the pilot flame is extinguished.

In Figures 3 and 4 a valve responsive to heat generated by the pilot flame has been shown and its position has been indicated by reference numeral 58 in Figure 8. The body of the valve has also been designated by numeral 58 and is constructed very similar to the body 10 of the valve already described and might be made substantially identical therewith but, for several reasons, it can be made somewhat simpler than the corresponding part of the main valve. The main valve opens when the temperature falls, whereas the valve which controls the pilot closes when the temperature of the thermostatic element falls below a predetermined value and since large temperature variations can take place between the opening and the closing of this valve, it does not require such careful adjustments as the main valve.

The body 58 is preferably a brass casting and has an opening 13a at one end for the entrance of the gas and an opening 15a at the other end for the exit of the gas.

A partition 17a separates the openings. The wall of opening 15a has a threaded opening 18a for the reception of the tubular plug 19a whose outer surface serves as a valve seat. The wall of opening 13a has an opening 28a. The body 58 has a tubular projection 59 to which one end of the copper tube 24a is threadedly connected. A lock nut 60 serves to hold the copper tube against accidental rotation, and forms a gas-tight seal. An invar bar 25 is connected with the inner end of tube 24, as by being brazed or otherwise secured thereto. When the tube 24a and the bar 25 are heated the tube expands faster than the bar and the outer end of the latter moves inwardly. The valve member 22a is provided with a central hub 61 and is attached to the points 40 of a resilient strip like that shown in Figures 5, 6 and 7, and already described.

One end of the strip is attached to a block 32a which is made substantially the same as the block 32 already described, but which is somewhat longer and has a hole 62 for the reception of the end of the bar 25. The diaphragm 37 has its convex side on the lower side and positioned to be directly engaged by the end of the bar 25, it being a requisite that the pressure must be applied to the convex side of the diaphragm.

When the tube 24a is hot the parts are in the position shown in Figure 3, but if the pilot flame is extinguished the tube 24a cools and increases the pressure on the depressed area and the strip "snaps" moving the valve member 22a into engagement with the annular valve seat on plug 19a.

A cap 42a is secured to the valve body by screws 43, but no adjusting device like that which comprises the knob 49 is employed because the parts do not require adjustment after being installed, and the necessary adjustments are made before installation by rotating the tube 24a and locking it in adjusted position by the nut 60.

For the purpose of transmitting heat from the flame of the pilot burner to the tube 24a without exposing the tube to the destructive action of the flame, the means shown in Figures 3 and 4 has been provided.

A copper strip 63 is bent around the tube, in the manner shown in Figure 4, and clamped to the tube by the bolt 64. The ends of the strip are bent outwardly, as indicated by numeral 65, and a plate 66 of nickel steel or other heat resisting material is secured to the ends 65 by rivets 67 or by spot welding. The pilot burner is so positioned that the flame will pass through the opening between sides 65 and the end plate 66 and strike the under surface of member 66 but does not come in contact with the copper strip 63 which serves merely as a support for the plate 66 and as a conductor to convey the heat to the tube 24a.

Before the pilot flame is lighted the valve shown in Figure 3 is closed and gas can therefore not flow to the burner 53 even if the main valve is open. After the pilot flame has burned for some time and heated the tube 24a to a predetermined temperature, the valve will open and if the main valve is also open, gas will flow to the burner 53 and be ignited by the pilot flame. If the pilot flame goes out the gas to the burner will be automatically cut off, as already explained.

Although the device has been explained in connection with an automatic hot water heater, it can be used for furnaces and ovens of all kinds where gas is used and where automatic regulation is desired.

In the above description mention has been made of the fact that this device can be used for controlling an electric circuit as well as a valve and in Figure 9 a simple modification of Figure 3 has been shown in which the valve 22a has been removed and an electric contact 67, which is supported in an insulating plug 68, provided. A battery 69 has one pole connected with the contact 67 by means of a conductor 70 and the other connected to the magnet 72 of a relay whose armature has been designated by numeral 74. A conductor 73 serves to connect the other end of the magnet coil with the base of the switch.

The relay switch is normally held in open position by the spring 74 and conductors 75 and 76 may extend to some electric switch or electrically controlled valve or other apparatus. When the rod 25 exerts the required pressure on the convex surface 37 the strip 35 will snap and make contact with the end of screw 67, thereby closing the circuit to the relay.

Attention is called to the fact that the valves close with the pressure and this assures that there will be no leakage if the pressure should accidentally be increased.

In Figure 1 the spring strip 35 is inserted through the yoke and the convex surface of the diaphragm is toward the outside. Among other advantages of this construction is this, that if the device is subjected to very low temperatures, as during shipment or storage, the excessive contraction of the tube 24a will move the screw 31 away from the surface 37 and not force it against this surface.

Another advantage of the construction illustrated in Figure 1 is that it adapts the device admirably for use with ovens where the operating temperature sometimes exceeds 400° F., while the normal temperature when the oven is not in use, is usually 70° F., making a temperature change of over 300° F.

Owing to the fact that screw 31 moves away from the diaphragm when members 24 and 25 cool, there is no danger of damage being caused to the diaphragm as a result of large temperature variations.

Special attention is called to the fact that with the construction described above the thermo-responsive elements apply pressure directly to the diaphragm 37 thereby obviating the necessity of levers and thereby greatly simplifying the construction.

The strip 35 acts as a cantilever and flexes about a transverse axis passing through the diaphragm as shown in Figure 6. The flanges 36 give rigidity to the lever and the force exerted in opening and closing the valve is comparatively large.

The bar 26 and yoke 27 shown in Figure 1 forms a non-expansive assembly which transmits the movement of the outer end of tube 24 directly to the diaphragm.

The removable valve seat 19a can be omitted and the valve seat formed by the surface of the casting.

It will be noted that when the cap 42, 42a is removed all of the movable parts are accessible, thereby facilitating assembly, adjustment and repair.

When large currents are to be controlled by the switch illustrated in Figure 9, a mercury switch may be employed or any other form of switch, designed to handle heavy currents substituted.

The thermo-responsive elements 24 and 25, can, of course, be heated in any way as by being enclosed in a coil of wire through which a current flows, and the device shown in Figure 9 can therefore be used as an overload circuit breaker. It is not, however, the intention to point out here all the uses to which the invention can be put.

Attention is called to the fact that the valve 35 (22 and 22a) seats with the gas pressure and that the inlet and outlets may be reversed, which necessitates a reversal of the position of the valve as shown in Figures 1 and 3. When the statement is made in the claims or specification that the valve is located at the opening between the inlet and the chamber, this should be construed as covering the obvious equivalent reversal shown in Figure 3.

What we claim and desire to secure by Letters Patent is:

1. A thermo-responsive assembly comprising, a valve body, a tubular member of metal having a high coefficient of expansion, attached at one end to the value body, a rod passing through the tube and attached to one end thereof, the rod having a small coefficient of expansion relative to the tube, a yoke attached to the outer end of the rod and provided with an opening, and a screw threadedly connected with the outer wall of the yoke, and a resilient strip having one end connected with the valve body, passing through the yoke, and positioned to be engaged by the screw.

2. A thermo-responsive control device comprising, in combination, a body member, a copper tube having one end attached thereto, a rod having a low coefficient of expansion located in the tube and attached to the free end thereof, the other end of the bar extending through an opening in the body member, a yoke secured to the free end of the bar, the yoke having an opening, a resilient metal strip having one end attached to the body and passing through the yoke, the strip having a concave depression positioned in the yoke opening, the convex side being adjacent the outer wall of the yoke and a screw operatively connected with the outer wall of the opening and positioned to engage the convex surface of the depressed area.

3. A thermostatically controlled valve mechanism comprising an elongated body having an inlet at one end and an outlet at the other, separated by an imperforate partition, a housing removably connected with one side of the body and forming therewith a closed chamber, the wall of the body between the inlet and the chamber having openings communicating the inlet and the outlet with the interior of the chamber, a valve seat surrounding the opening between the inlet and the chamber, a movable valve member cooperating with the seat for sealing the opening, a flexible strip of resilient metal having one end secured to the body member and the other end movably connected with the valve member, the strip extending across the opening between the outlet and the chamber, the last named opening extending entirely through the body, a thermo-responsive means connected with the body and having a valve operating member extending through the opening that communicates the chamber and the outlet, the flexible strip having a portion of its surface depressed to form a concavo-convex diaphragm, the valve operating member having a yoke member through which the flexible strip extends, the convex surface of the diaphragm facing the outer wall of the opening in the yoke, a screw extending through the outer wall of the yoke and engaging the convex surface of the diaphragm, and means carried by the housing and accessible from the outside thereof for turning the screw to effect an adjustment thereof.

OSCAR W. ANDERSON.
EDWARD E. FORRESTER.